US006888565B1

United States Patent
Tanaka et al.

(10) Patent No.: US 6,888,565 B1
(45) Date of Patent: May 3, 2005

(54) APPARATUS AND METHOD FOR REMOTE-CONTROLLING IMAGE SENSING APPARATUS IN IMAGE SENSING SYSTEM

(75) Inventors: Kenichiro Tanaka, Kawasaki (JP); Hiroshi Okazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/386,814

(22) Filed: Aug. 31, 1999

(51) Int. Cl.⁷ ............................................... H04N 5/225
(52) U.S. Cl. ............................... 348/207.11; 348/207.1
(58) Field of Search ...................... 348/207.11, 207.1

(56) References Cited

U.S. PATENT DOCUMENTS

| | | | |
|---|---|---|---|
| 4,992,866 A | | 2/1991 | Morgan ...................... 358/108 |
| 5,528,289 A | * | 6/1996 | Cortjens et al. ......... 348/211.9 |
| 6,002,995 A | * | 12/1999 | Suzuki et al. ............... 702/188 |
| 6,266,082 B1 | * | 7/2001 | Yonezawa et al. .......... 348/159 |
| 6,266,085 B1 | * | 7/2001 | Kato et al. ............... 348/211.7 |
| 6,542,191 B1 | * | 4/2003 | Yonezawa ............... 348/333.01 |
| 2001/0019355 A1 | * | 9/2001 | Koyanagi et al. ............. 348/36 |
| 2001/0024233 A1 | * | 9/2001 | Urisaka et al. ............. 348/213 |
| 2001/0026318 A1 | * | 10/2001 | Yonezawa et al. .......... 348/159 |
| 2001/0033332 A1 | * | 10/2001 | Kato et al. .................. 348/211 |
| 2002/0067412 A1 | * | 6/2002 | Kawai et al. ............... 348/211 |

FOREIGN PATENT DOCUMENTS

| | | | |
|---|---|---|---|
| JP | 04-068893 | 3/1992 | ............ H04N/7/18 |
| JP | A 6-284330 | 7/1994 | |
| JP | A 8-154197 | 11/1996 | |
| JP | 10-42279 | 2/1998 | |

OTHER PUBLICATIONS

English Abstract of Japanese Patent Laid Open No. 04–068893.
English Abstract of JPA 8–154197 which corresponds to US 2002/0067412 cited in OA dated Apr. 24, 2003.
English Abstract of JPA 6–284330.
Japanese Office Action.

* cited by examiner

Primary Examiner—Wendy R. Garber
Assistant Examiner—James M. Hannett
(74) Attorney, Agent, or Firm—Morgan & Finnegan, LLP (57) ABSTRACT

A graphical user interface (GUI) which displays a map image showing the location of a camera whose sensed image is distributed via a network, and further displays a camera icon indicative of the position and states of the camera on the map image. When a user designates an area desired to be sensed on the GUI after the user obtains authorization to control the camera, control values for controlling facing direction and the angle of view of the camera are calculated. The calculated control values are transmitted to a camera server via the network, and the camera server controls the camera on the basis of the control values.

19 Claims, 8 Drawing Sheets

ZOOMED IN

FIG. 3A

ZOOMED OUT

FIG. 3D

AUTHORIZATION IS ISSUED

FIG. 3C

AUTHORIZATION IS NOT ISSUED

APPARATUS AND METHOD FOR REMOTE-CONTROLLING IMAGE SENSING APPARATUS IN IMAGE SENSING SYSTEM

BACKGROUND OF THE INVENTION

The present invention relates to control method and control apparatus for an image sensing system in which image signals sensed by an image sensing apparatus are distributed to clients via network, and a storage medium storing program codes for realizing the method.

An image transmission system in which media data, such as an image and sound obtained by a video camera on a network, such as the Internet, are transmitted to a plurality of clients via the network has been developed.

On a remote monitoring system in which a camera is connected to a network, panning, tilting, and zooming operation of the camera can be remote-controlled, and an image obtained by the camera is transmitted to and browsed by a plurality of clients via the network is available. Such a system is disclosed in Japanese Patent Application Laid-Open No. 10-42279.

In this type of transmission system, however, since the camera is controlled from a remote location, it is difficult for clients to know where the camera is located and which direction the camera is facing. Therefore, it is also difficult for the clients to browse desired images quickly.

SUMMARY OF THE INVENTION

The present invention has been made in consideration of the above situation, and has as its object to provide a method and apparatus for controlling an image sensing apparatus in an image sensing system which enable a client to easily control the image sensing apparatus from a remote location.

According to the present invention, the foregoing object is attained by providing a remote control apparatus for remote controlling an image sensing apparatus by changing image sensing conditions of the image sensing apparatus, the remote control apparatus comprising: map display means for displaying map information; state display means for obtaining parameters of the image sensing apparatus and displaying a position and state of the image sensing apparatus on the map information displayed by the map display means on the basis of the parameters; designation means for designating an image sensing area to be sensed by the image sensing apparatus on the map information; and control value calculation means for calculating a control value for controlling the image sensing apparatus on the basis of the image sensing area designated by the designation means.

According to the present invention, the foregoing object is also attained by providing an image sensing system which remote controls an image sensing apparatus by changing image sensing conditions of the image sensing apparatus, the system comprising: map display means for displaying map information; state display means for obtaining parameters of the image sensing apparatus and displaying a position and state of the image sensing apparatus on the map information displayed by the map display means on the basis of the parameters; designation means for designating an image sensing area to be sensed by the image sensing apparatus on the map information; and control means for controlling the image sensing apparatus on the basis of the designation by the designation means.

Further, the foregoing object is also attained by providing a remote control method for remote controlling an image sensing apparatus by changing image sensing conditions of the image sensing apparatus, the method comprising: a map display step of displaying map information; a parameter obtaining step of obtaining parameters of the image sensing apparatus; a state display step of displaying a position and state of the image sensing apparatus on the map information displayed in the map display step on the basis of the parameters obtained in the parameter obtaining step; a designation step of designating an image sensing area to be sensed by the image sensing apparatus on the map information; and a control step of controlling the image sensing apparatus on the basis of the designation in the designation step.

Furthermore, the foregoing object is also attained by providing a computer program product comprising a computer usable medium having computer readable program code means embodied in the medium for remote controlling an image sensing apparatus by changing image sensing conditions of the image sensing apparatus, the product comprising: first computer readable program code means of a map display step for displaying map information; second computer readable program code means of a parameter obtaining step for obtaining parameters of the image sensing apparatus; third computer readable program code means of a state display step for displaying a position and state of the image sensing apparatus on the map information displayed in the map display step on the basis of the parameters obtained in the parameter obtaining step; fourth computer readable program code means of a designation step for designating an image sensing area to be sensed by the image sensing apparatus on the map information; and fifth computer readable program code means of control step for controlling the image sensing apparatus on the basis of the designation in the designation step.

According to the configurations as described above, a current position and image sensing states of a camera are shown by a camera icon in an easily recognizable manner. Furthermore, by directly designating a desired area on a graphical user interface, the direction and zoom value of the camera are easily controlled.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENT

A preferred embodiment of the present invention will be described in detail below in accordance with the accompanying drawings.

Figure 1:
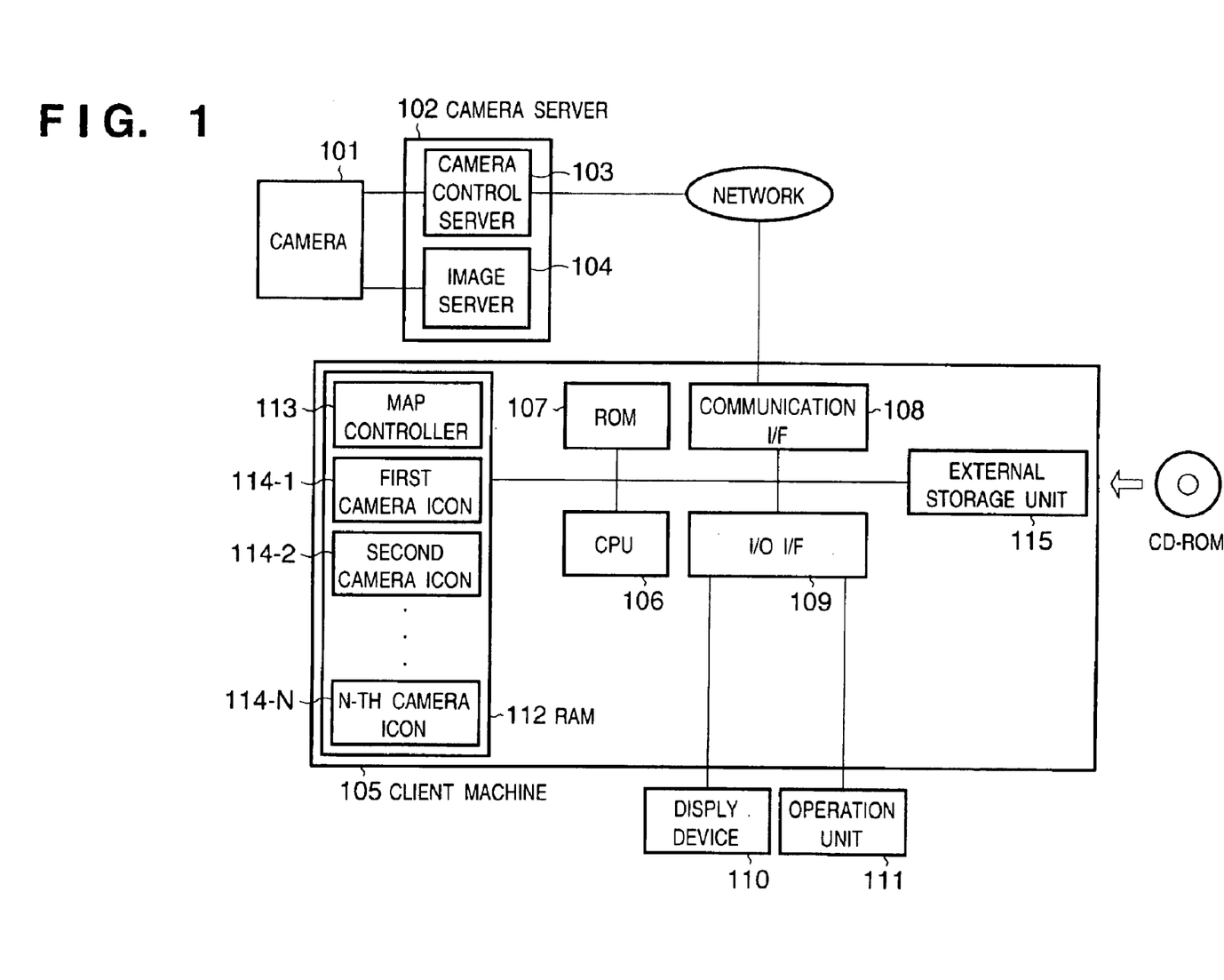
FIG. 1 is a block diagram illustrating a configuration of an image sensing system according to an embodiment of the present invention.

FIG. 1 is a block diagram illustrating a configuration of an image sensing system according to the embodiment of the present invention. In FIG. 1, reference numeral 101 denotes an image sensing apparatus, and a camera is used in the embodiment. Further, reference numeral 102 denotes a camera server which is realized on the basis of a personal computer and connects to the camera 101. The camera server 102 includes a camera control server 103 and an image server 104, and controls the camera 101 by the camera control server 103. The image server 104 captures an image sensed by the camera 101. The camera server 102 can be used on a network, and in such a case, the camera server 102 receives parameters for controlling the camera 101 from an external computer on the network, for instance, and the camera control server 103 controls the camera 101 using the received parameters. Further, a captured image is transmitted from the image server 104 to an external computer via the network. A detailed explanation of the camera server 102 is in Japanese Patent Application Laid-Open No. 10-42279.

Further, reference numeral 105 denotes a client machine, and realized on the basis of a personal computer. In the client machine 105, reference numeral 106 denotes a CPU; 107, ROM; 108, a communication interface; 109, an input/output interface; and 112, RAM. In the RAM 112, a program for realizing the embodiment and data necessary for executing the program are stored. More specifically, a map controller 113 and objects of first to N-th camera icons 114-1 to 114-N are stored. Further, reference numeral 110 denotes a display device; and 111, an operation unit, such as a mouse and a keyboard. Reference numeral 115 denotes an external storage unit for driving an external storage medium, such as a floppy disk and a CD-ROM. When the control program is stored in the external storage medium instead of the RAM 112, the program is read and loaded down from the external storage medium.

Figure 2:
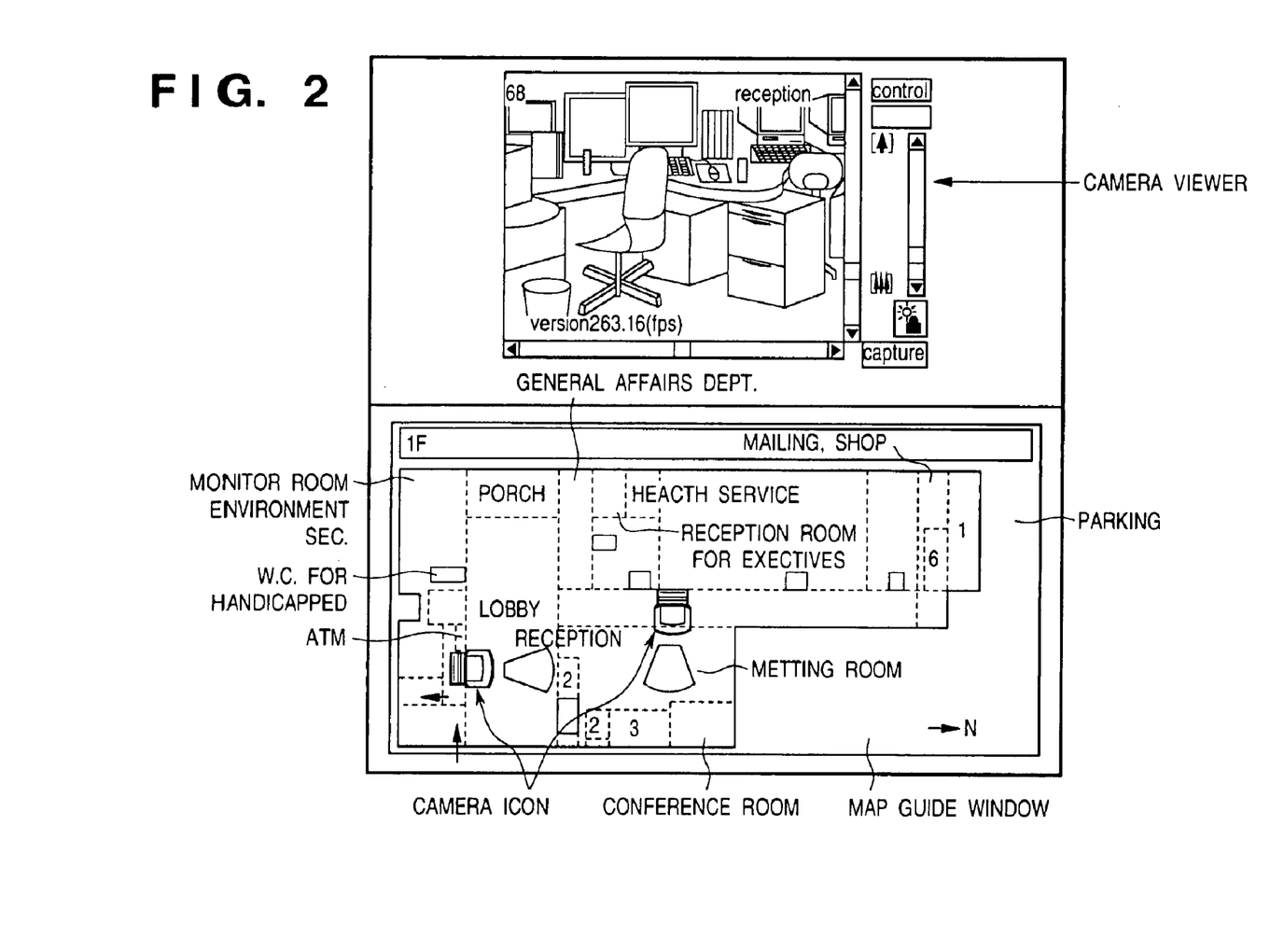
FIG. 2 is a view of a user interface of the present invention.

FIG. 2 shows a graphical user interface (GUI) according to the embodiment of the present invention.

The upper window is a camera viewer where an image transmitted by the camera server 102 is display. Further, it is possible to designate the direction, panning and tilting of the camera by operating scroll bars arranged on the right and bottom of the transmitted image. A camera viewer of this type is explained in detail in Japanese Patent Application Laid Open No. 10-42279.

A map guide window and camera icons are displayed below the camera viewer. These images are displayed on the basis of the map controller 113 and the objects of the first to N-th camera icons 114-1 to 114-N stored in the RAM 112. The map guide window is for receiving inputs from a mouse operated by a user and controlling the camera. The camera icons are for graphically showing current states (e.g., panning, zooming) of cameras on a map of the map guide window.

Figure 3A:
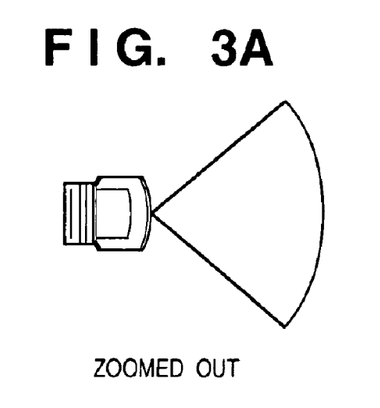
FIGS. 3A to 3D are views for explaining states which camera icons show.
Figure 3B:
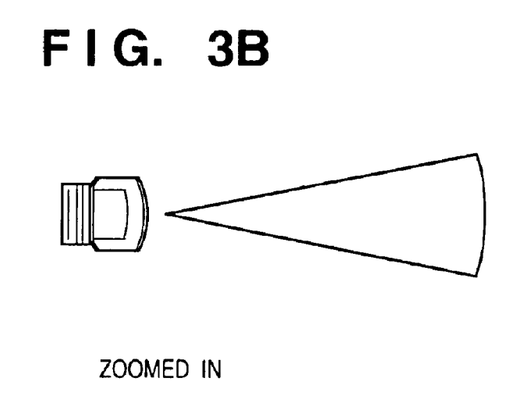

FIGS. 3A to 3D are explanatory views for explaining states shown by camera icons. In FIGS. 3A to 3D, the visual fields of cameras are expressed by sector forms. Specifically, FIG. 3A shows a zoomed-out state, and FIG. 3B shows a zoomed-in state.

As shown in FIGS. 3A and 3B, by graphically displaying an area where the camera is viewing in sector forms, a user can easily understand the information, such as the area a camera is viewing and the direction the camera is facing.

In the embodiment, it is assumed that a plurality of clients may simultaneously access the camera (i.e., camera server 102), and in such a case, difficulties will occur if several clients try to control the camera at the same time. Therefore, in the embodiment, a single client authorized to control the camera (referred to as "authorization" hereinafter) is allowed to control the camera at a time.

For example, when a user of a client machine wants to control the camera, the client machine requests the authorization to the camera server 102, and, if no client holds the authorization at the time of the request, then the authorization is issued to the user. The authorization is valid for a predetermined period, and the user is allowed to control the camera for the predetermined period. Whereas, if another client holds the authorization at the time of the request, the authorization is issued to the requested client after the authorization issued to the other client is expired. A period of validation and a priority order of clients that the authorization is given, for instance, may be set differently. Detailed explanation on authorization is also disclosed in Japanese Patent Application Laid-Open No. 10-42279.

Figure 3C:
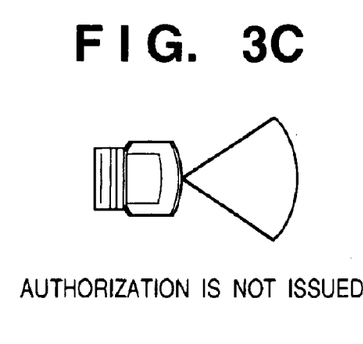
Figure 3D:
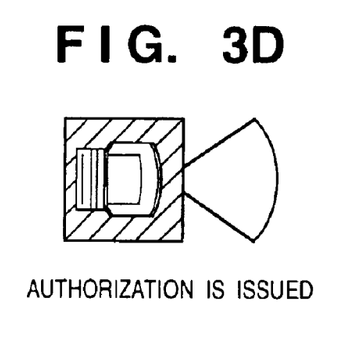

In the embodiment of the present invention, when authorization to control a camera is issued to a client, a camera icon corresponding to the camera is surrounded by a color frame which is easily distinguished from the background image, e.g., a map. FIG. 3C shows a state that authorization to control the camera is not issued to a client, and FIG. 3D shows a state that authorization is issued to a client. It should be noted that a method for showing that authorization to control a camera is issued to a client is not limited to surrounding a corresponding camera icon by a color frame, and any methods may be used as far as whether or not the authorization is issued to a client is informed to a user. For instance, when authorization is not issued, a corresponding camera icon may be shown by dot lines, whereas when authorization is issued, the corresponding camera icon may be shown by solid lines. As another example, a color of a camera icon may be changed depending upon whether or not the authorization to control a camera is issued.

Next, a display sequence of a camera icon is explained with reference to FIG. 4.

First in step S401, initialization is performed. More specifically, icon images are generated and variables are initialized in step S401. Thereafter, the client connects to the camera control server 103 in step S402, then the process proceeds to step S403.

In step S403, whether or not the connection between the client and the camera control server 103 is disconnected is checked. If it is, then the process proceeds to step S404 where the process is completed. Whereas, if the connection is still valid, then the process proceeds to step S405 where the client inquires the camera control server 103 of current panning and zooming values, and in step S406, the camera icon is updated on the basis of the obtained panning and zooming values and displayed on the map in the map guide window shown in FIG. 2.

Next, an operation of the map controller 113 is explained with reference to FIG. 5.

First in step S501, initialization is performed. More specifically, a map image is generated, and various editorial functions are initialized. Thereafter, in step S502, the map controller 113 connects to the camera server 102 and generates camera icon/icons in step S503. The generated camera icon/icons is/are displayed on the map in the map guide window in accordance with a flowchart shown in FIG. 4.

Next, in step S504, whether or not a mouse is clicked by a user is checked. If it is, the process proceeds to step S505, whereas if it is not, the process proceeds to step S508.

In step S505, whether or not a pointer is on a camera icon when the mouse is clicked is checked. If the pointer is on the camera icon (YES in step S505), then the process proceeds to step S506 where authorization to control a corresponding camera is requested to the camera control server 103. Whereas, if the pointer is not on the camera icon (NO in step S505), then the process proceeds to step S507 where vectors for keeping the mouse locus, which will be explained later, is initialized.

In step 5508, whether or not drag operation is performed by the mouse is checked. If it is, then coordinates of a pointer of the mouse are stored as vectors of the mouse locus at a predetermined interval, and the mouse locus is displayed on the map in the map guide window. Examples of displayed mouse loci are explained later with reference to FIGS. 7A to 7C. Whereas, if drag operation is not performed, then the process proceeds to step S510.

In step S510, whether or not the mouse is released (a button of a mouse which has been held by a user is released) is checked. If it is not, the process proceeds to step S515, whereas if it is, the process proceeds to step S511. In step S511, whether or not the client machine holds authorization is checked, if it does not, the process proceeds to step S515.

If the client machine holds the authorization, then in step S512, the minimum value, the maximum value and the center value of the coordinate data stored as the vectors of mouse locus are obtained for both x and Y axes. From these values, the smallest rectangular area which includes the mouse locus is obtained.

In step S513, coordinates of the rectangular area obtained in step S512 are compared with coordinates of the camera icon, and panning and zooming values of the camera are determined.

An example of processes performed in steps S512 and S513 are explained with reference to FIG. 6.

First, on the basis of the difference between the coordinates of the camera icon and the coordinates of the upper left corner of the rectangular area, an angle θ1 between the left limit of the angle of view and the direction to which the camera is currently facing is obtained. Further, on the basis of the difference between the coordinates of the camera icon and the coordinates of the lower right corner of the rectangular area, an angle θ2 between the right limit of the angle of view and the direction to which the camera is currently facing is obtained. Furthermore, on the basis of the difference between the coordinates of the camera icon and the coordinates of the center of the rectangular area, an angle θ3 between the direction to which the camera is going to face and the direction to which the camera is currently facing is obtained.

The aforesaid sequence is realized by executing a program stored in the RAM 112 by the CPU 106.

Further, in step S514, the camera is controlled on the basis of the values obtained in step S513 in the aforesaid manner. Specifically, the client requests the camera control server 103 to rotate the direction faced by the camera by θ3 degrees, and set the angle of view (i.e., zoom) of the camera to (θ1−θ2) degrees. Thereafter, the vectors of the mouse locus are cleared, and the process proceeds to step S515.

In step S515, the map as a background image, a camera icon/icons, and a mouse locus (if the vectors of the mouse locus exist, in other words, when the process proceeds from step S509 or S510 to step S515) are rendered in the aforesaid order.

In step S516, whether or not the connection between the map controller 113 and the camera control server 103 is disconnected is checked. If it is, the process proceeds to step S517 where the processing is completed. Whereas, if it is not, the process returns to step S504 and the steps S504 to S516 are repeated.

By operating as described above, it is possible to display the state of a camera at real time by means of a camera icon.

Figure 6:
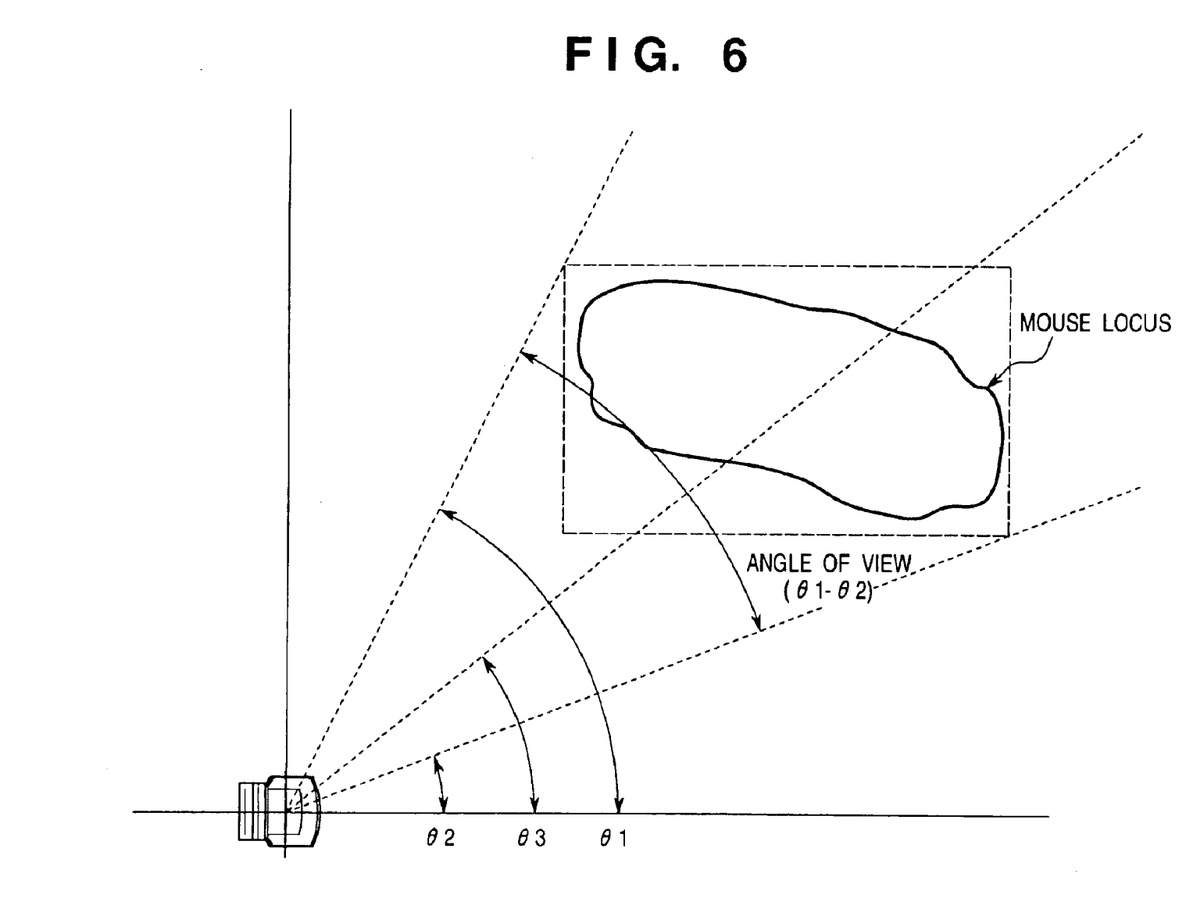
FIG. 6 is an explanatory view for explaining a sequence for obtaining panning and zooming values.

Note, in FIG. 6, a case where the camera icon faces to the right is explained for the sake of descriptive convenience, however, the direction which the camera faces varies in practice. Thus, it is necessary to calculate angles in consideration of the direction which the camera faces to.

Figure 4:
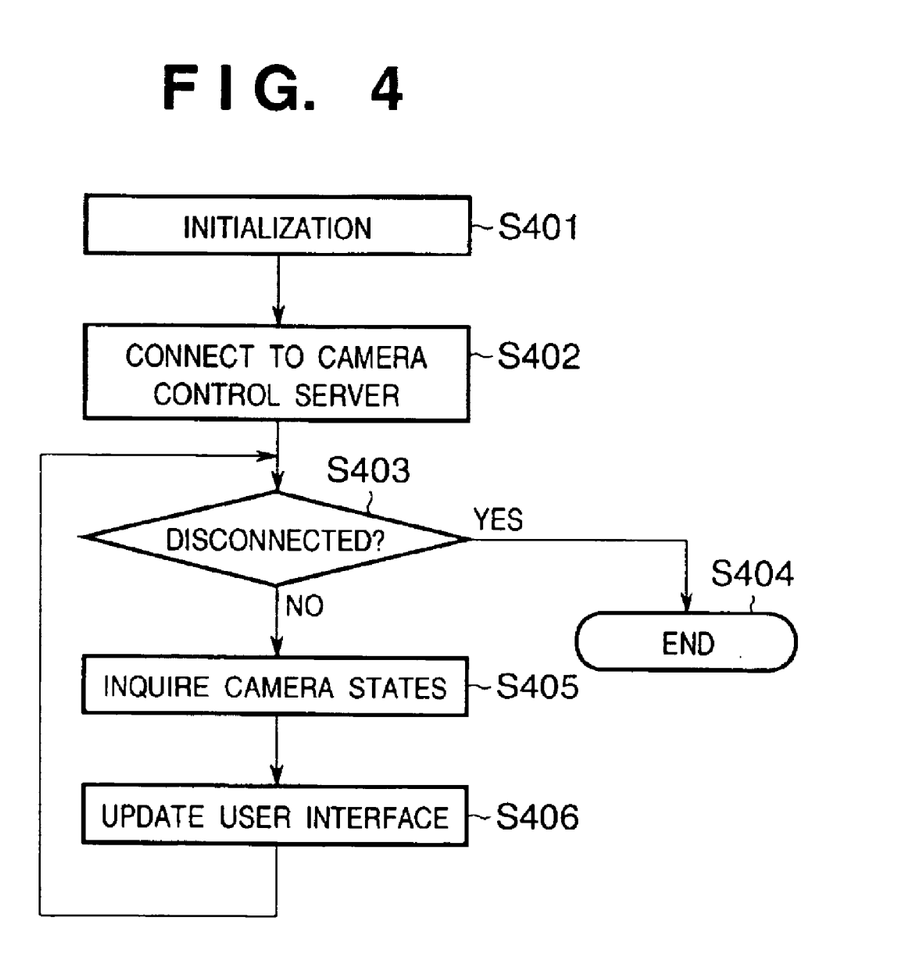
FIG. 4 is a flowchart of a display sequence of a camera icon.
Figure 5:
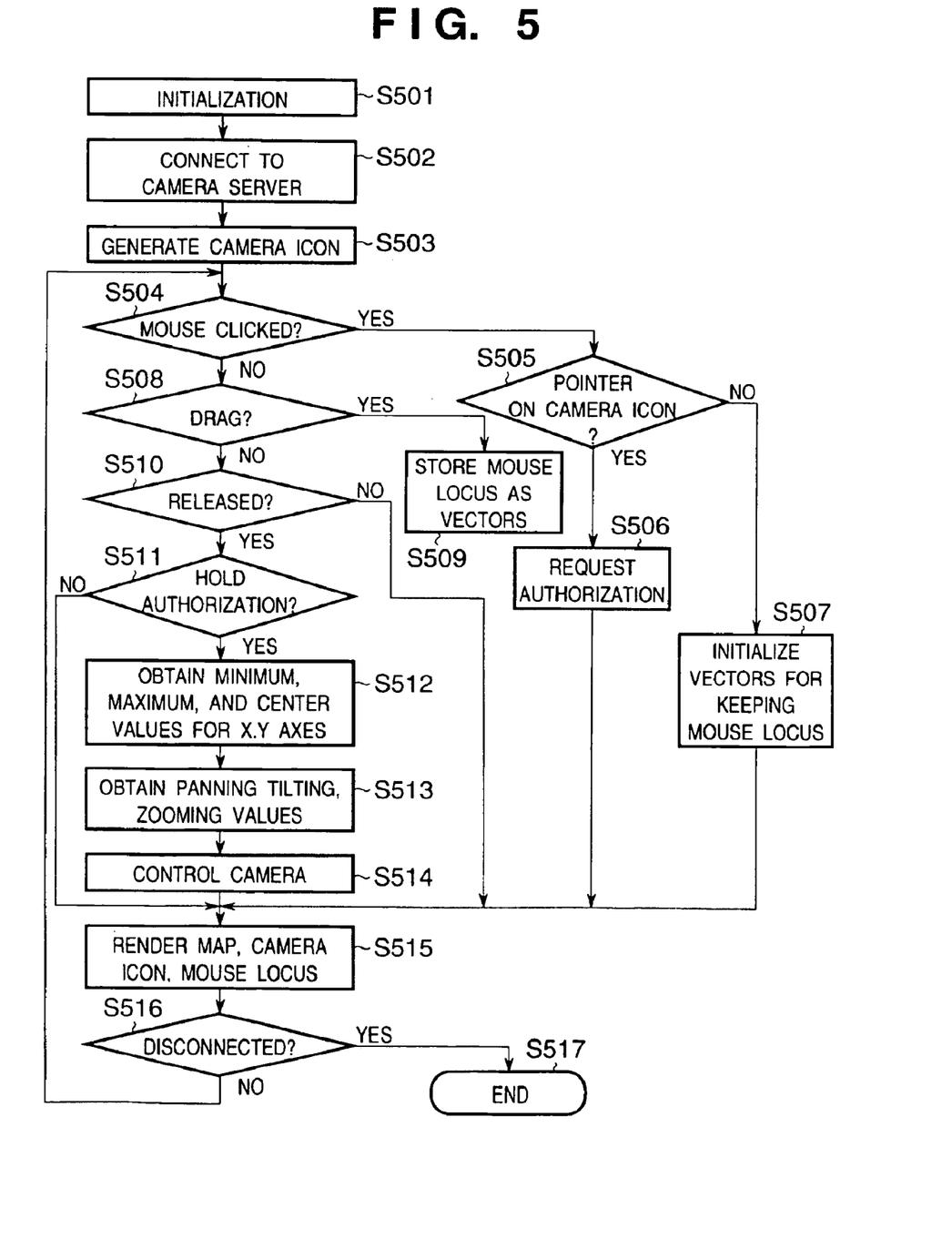
FIG. 5 is a flowchart for explaining an operation of a map controller.

Next, examples of images displayed in the map guide window when the client machine is controlled on the basis of the flowcharts shown in FIGS. 4 and 5 are explained with reference to FIGS. 7A to 7C.

Figure 7A:
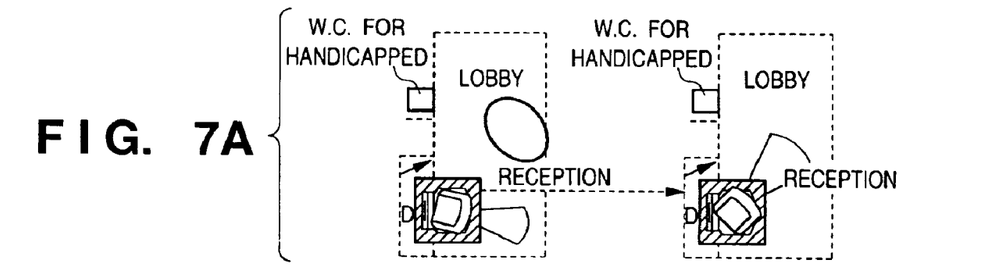
FIGS. 7A to 7C show images of icons before and after image sensing areas are designated.

When the camera icon is originally as shown on the left side of FIG. 7A and an upper right area of the "lobby" is designated, the panning and zooming of the camera are controlled so as to view the designated area and the controlled panning and zooming states of the camera as shown on the right side of FIG. 7A are displayed in the map guide window.

Figure 7B:
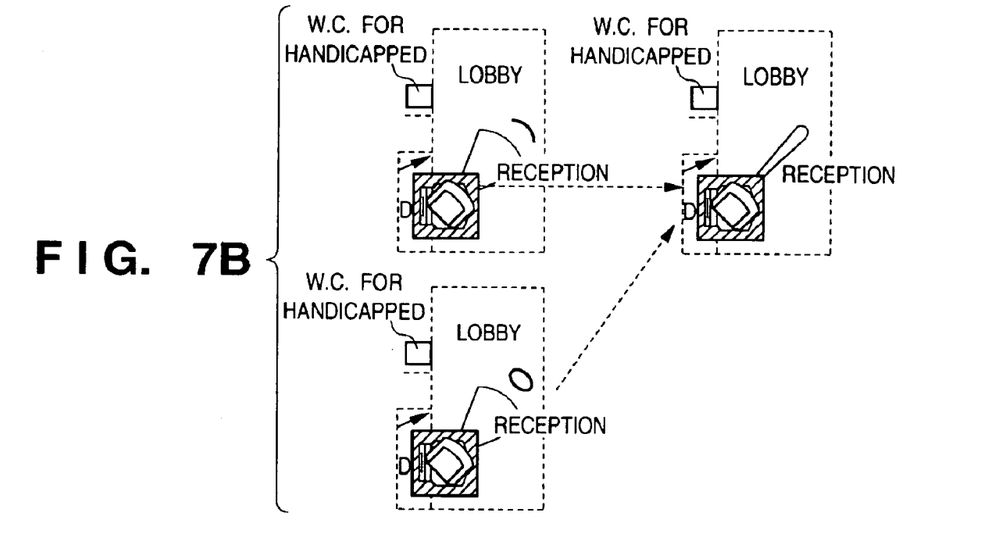

When the camera icon is originally as shown on the left upper portion or left lower portion of FIG. 7B, and the angle of view is to be narrowed, or zoom-in operation is desired, by designating a smaller area, the camera zooms in so as to view the designated area and the controlled zooming state of the camera as shown on the right side of FIG. 7B is displayed in the map guide window.

Figure 7C:
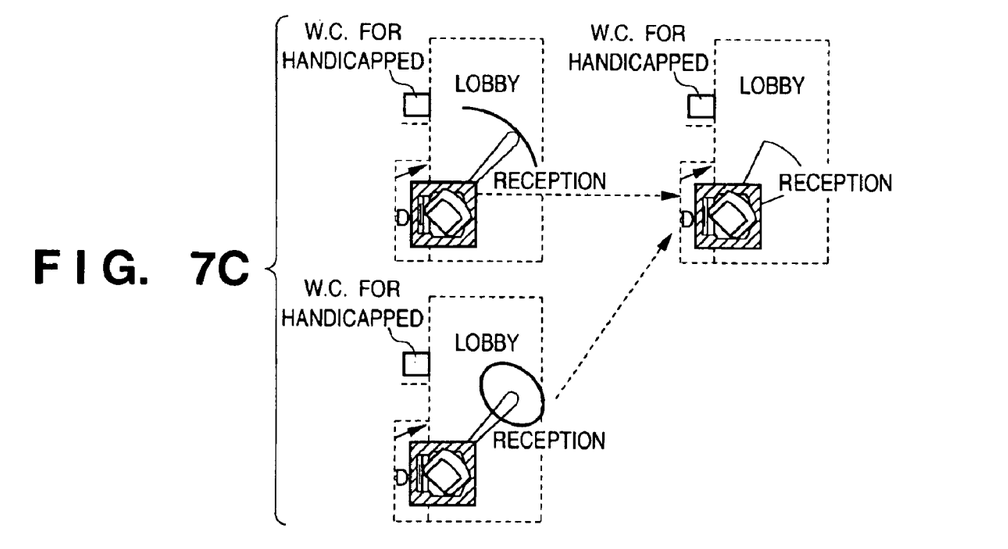

When the camera icon is originally as shown in the left upper portion or left lower portion of FIG. 7C, and the angle of view is to be widened, or zoom-out operation is desired, by designating a wider area, the camera zooms out so as to view the designated area and the controlled zooming state of the camera as shown on the right side of FIG. 7C is displayed in the map guide window.

It should be noted that a case where a field of vision desired to be sensed by a camera is designated by operating the mouse is explained in the above embodiment; however, the present invention is not limited to this, and any method is possible as long as a desired area can be designated. For example, a touch sensor may be provided on the display so that the desired area to be viewed can be designated.

According to the embodiment as described above, a current position and image sensing states of a camera are displayed in an easily recognizable manner. Furthermore, by directly designating a desired area on the GUI, the direction and zoom value of the camera are easily controlled.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiment are realized by executing the program codes which are read by a computer, the present invention includes a case where an OS (operating system) or the like working on the computer performs a part or the entire processes in accordance with designations of the program codes and realize functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiment.

Figure 8:
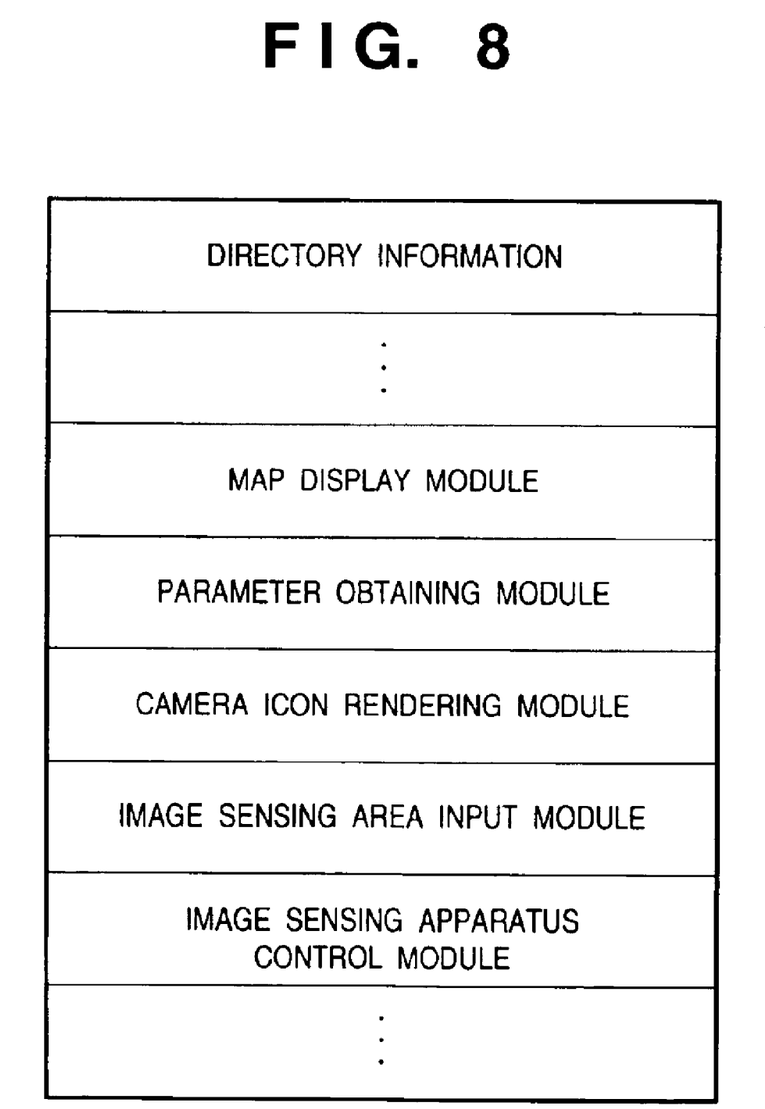
FIG. 8 is a memory map of program codes used for remote-controlling an image sensing apparatus of the present invention.

In a case where the present invention is applied to the aforesaid storage medium, the storage medium stores program codes corresponding to the flowcharts described in the embodiment. Briefly, the storage medium stores each module shown as an example of a memory map in FIG. 8. More specifically, program codes which correspond to map display module, parameter obtaining module, camera icon rendering module, image sensing area input module, and image sensing apparatus control module, at least, are to be stored in the storage medium.

The present invention is not limited to the above embodiments and various changes and modifications can be made within the spirit and scope of the present invention. Therefore to apprise the public of the scope of the present invention, the following claims are made.

What is claimed is:

1. A remote control apparatus for remote controlling an image sensing apparatus by changing image sensing conditions of the image sensing apparatus, said remote control apparatus comprising:
a map display device which displays map information;
a state display device which obtains parameters of the image sensing apparatus and displays a symbol which indicates a position and state of the image sensing apparatus on the map information displayed by said map display device on the basis of the parameters;
a designation device which allows direct designation on the displayed map information of an arbitrary size, shape, and position of image sensing area to be sensed, independent of the current image sensing area, by the image sensing apparatus without changing the state of the symbol; and
a control value calculation device which calculates a control value for controlling an angle of view of the image sensing apparatus on the basis of the size of the image sensing area designated by said designation device.

2. The remote control apparatus according to claim 1, wherein said control value calculation device further calculates a direction of the image sensing apparatus on the basis of the image sensing area designated by said designation device.

3. The remote control apparatus according to claim 1, wherein said state display device obtains the parameters of the image sensing apparatus at a predetermined time interval.

4. The remote control apparatus according to claim 2, wherein the parameters include a direction of the image sensing apparatus.

5. The remote control apparatus according to claim 1, wherein the parameters include an angle of view of the image sensing apparatus.

6. The remote control apparatus according to claim 2, wherein said control value calculation device calculates a rectangular area which circumscribes the image sensing area designated by said designation device, obtains X and Y coordinates of each vertex of the rectangular area on the map information, and determines a direction to the center of the rectangular area as the direction of the image sensing apparatus, and a smallest angle which includes all the vertices of the rectangular area is determined as the angle of view of the image sensing apparatus.

7. An image sensing system which remote controls an image sensing apparatus by changing image sensing conditions of the image sensing apparatus, said system comprising:
a map display device which displays map information;
a state display device which obtains parameters of the image sensing apparatus and displays a symbol which indicates a position and state of the image sensing apparatus on the map information displayed by said map display device on the basis of the parameters;
a designation device which allows direct designation on the displayed map information of an arbitrary size, shape, and position of image sensing area to be sensed, independent of the current image sensing area, by the image sensing apparatus without changing the state of the symbol; and
a control device which controls an angle of view of the image sensing apparatus on the basis of the size of the designation by said designation device.

8. The image sensing system according to claim 7, wherein said control device further controls a direction of the image sensing apparatus on the basis of the image sensing area designated by said designation device.

9. The image sensing system according to claim 7, wherein said state display device obtains the parameters of the image sensing apparatus at a predetermined time interval.

10. The image sensing system according to claim 8, wherein the parameters include a direction of the image sensing apparatus.

11. The image sensing system according to claim 7, wherein the parameters include an angle of view of the image sensing apparatus.

12. The image sensing system according to claim 8, further comprising a control value calculation device which calculates a control value for controlling the image sensing apparatus on the basis of the image sensing area designated by said designation device and outputting the control value to said control device,
wherein said control value calculation device calculates a rectangular area which circumscribes the image sensing area designated by said designation device, obtains X and Y coordinates of each vertex of the rectangular area on the map information, and determines a direction to the center of the rectangular area as the direction of the image sensing apparatus, and a smallest angle which includes all the vertices of the rectangular area is determined as the angle of view of the image sensing apparatus.

13. A remote control method for remote controlling an image sensing apparatus by changing image sensing conditions of the image sensing apparatus, said method comprising:

displaying map information;

obtaining parameters of the image sensing apparatus;

displaying a symbol which indicates a position and state of the image sensing apparatus on the displayed map information on the basis of the obtained parameters;

directly designating on the displayed map information an arbitrary size, shape, and position of image sensing area to be sensed, independent of the current image sensing area, by the image sensing apparatus without changing the state of the symbol; and controlling an angle of view of the image sensing apparatus on the basis of the size of the designated image sensing area.

14. The remote control method according to claim 13 further comprising controlling a direction of the image sensing apparatus on the basis of the designated image sensing area.

15. The remote control method according to claim 13, wherein the parameters of the image sensing apparatus are obtained at a predetermined time interval.

16. The remote control method according to claim 14, wherein the parameters include a direction of the image sensing apparatus.

17. The remote control method according to claim 13, wherein the parameters include an angle of view of the image sensing apparatus.

18. The remote control method according to claim 14, further comprising calculating a control value for controlling the image sensing apparatus on the basis of the designated image sensing area and outputting the control value, wherein, in calculating the control value, a rectangular area which circumscribes the designated image sensing is calculated, X and Y coordinates of each vertex of the rectangular area on the map information are obtained, and a direction to the center of the rectangular area is determined as the direction of the image sensing apparatus, and a smallest angle which includes all the vertices of the rectangular area is determined as the angle of view of the image sensing apparatus.

19. A computer program product comprising a computer usable medium having computer readable program code embodied in said medium for remote controlling an image sensing apparatus by changing image sensing conditions of the image sensing apparatus, said product comprising:

first computer readable program code for displaying map information;

second computer readable program code for obtaining parameters of the image sensing apparatus;

third computer readable program code for displaying a symbol which indicates a position and state of the image sensing apparatus on the displayed map information on the basis of the parameters by said second computer readable parameter obtaining program code;

fourth computer readable program code for allowing direct designation on the displayed map information of an arbitrary size, shape, and position of image sensing area to be sensed, independent of the current image sensing area, by the image sensing apparatus without changing the state of the symbol; and fifth computer readable program code for controlling an angle of view of the image sensing apparatus on the basis of the size of the designated image sensing area.

* * * * *